United States Patent Office 3,444,480

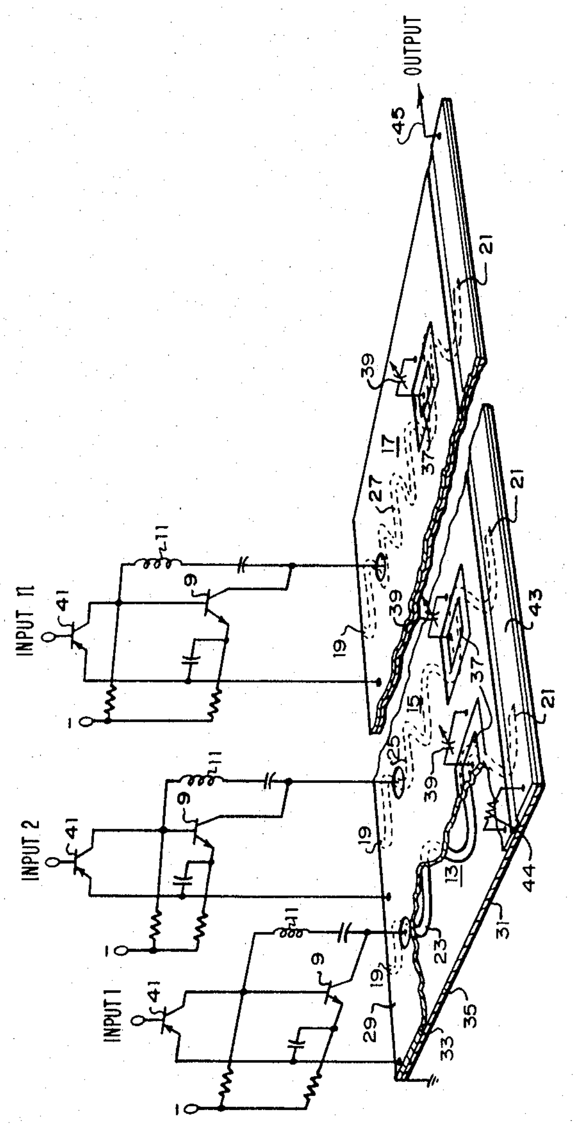
INVENTOR
ALEXANDER TYKULSKY
CHARLES A. KINGSFORD-SMITH
BY A. C. Smith
ATTORNEY

Patented May 13, 1969

3,444,480

HIGH FREQUENCY OSCILLATOR EMPLOYING A TRANSMISSION LINE HAVING AN ELECTRICALLY ADJUSTABLE SECTION OF GROUND PLANE

Alexander Tykulsky, Menlo Park, Calif., and Charles A. Kingsford-Smith, Loveland, Colo., assignors to Hewlett-Packard Company, Palo Alto, Calif., a corporation of California

Filed Aug. 9, 1967, Ser. No. 659,353

Int. Cl. H03b *5/18, 7/12*

U.S. Cl. 331—96 5 Claims

ABSTRACT OF THE DISCLOSURE

A transistorized oscillator uses an etched-circuit transmission line as the frequency-determining element and uses the transit time through the transistor as a portion of the requisite phase shift around the feedback loop to sustain oscillations.

*Summary of the invention*

In accordance with the illustrated embodiment of the present invention, an etched-circuit transmission line determines the oscillation frequency of a single transistor oscillator circuit. The end of the transmission line electrically remote from its connection to the transistor is an open circuit and is capacitively coupled to a 50-ohm output transmission line. Fine frequency adjustment is provided by altering capacitive loading of the transmission line at a location therealong intermediate the ends of the transmission line.

*Description of the drawing*

The drawing is a pictorial diagram of a plurality of oscillators formed on an etched circuit board and coupled to a common output transmission line.

*Description of the preferred embodiment*

Referring now to the drawing, there is shown a transistor 9 having an inductor 11 connected between the output collector and input base to form a closed loop oscillator circuit. It can be shown that current flowing in the collector of transistor 9 through the collector load produces a collector voltage approximately 180° out of phase with the current, and that an inductive load 11 contributes an additional amount of phase shift. The transit time through the transistor 9, normally a problem that circuit designers endeavor to compensate for, also contributes to the total phase shift around the feedback loop at typical frequencies of the order of 400 megahertz. Thus, signal appearing at the input of the transistor is returned in phase to the input to ensure sustained oscillations.

The collector load includes a resonator which is formed as a quarter-wave length transmission line having a shorted end 19 and an open end 21. The transmission line resonator includes a strip of laminate conductors 23, 25, 27 which is supported between upper and lower ground planes 29, 31 by insulating circuit boards 33 and 35. The collector electrode is connected to the strip conductors 23, 25, 27 at a point along the length thereof near the shorted end where the impedance looking into the line at the connection point is low at the oscillation frequency but is sufficient to provide an amplified signal on the collector electrode. Typically, the connection point is positioned from the shorted end 19 about an eighth or tenth or less of the wave length of the oscillating signal in the transmission line thus formed. The signal appearing on the collector electrode is thus fed back to the input base electrode in proper phase relationship, as previously described, to sustain oscillations at a frequency determined by the length of the strip conductors 23, 25, 27.

Fine frequency adjustment, say ±2 megahertz about an operating frequency of 400 megahertz, may be accomplished by isolating a conductive area 37 from one of the conductive ground planes 29 at a location therein adjacent the strip conductors 23, 25, 27 and by connecting the isolated conductive area to the ground plane through an adjustable capacitor 39. This isolated area thus introduces lower effective capacity in that portion of the distributed transmission line structure and thus permits the circuit to oscillate at a higher frequency than with a continuous ground plane. Altering the adjustable capacitor 39 thus finely adjusts the frequency of oscillation.

The oscillator transistor 9 may be conveniently gated off to stop oscillations simply by applying a bias control signal to base electrode of the input transistor 41. For the type transistors and bias voltages shown, the oscillations may be stopped by applying a bias control signal of sufficient amplitude and positive polarity to the base electrode of transistor 41 and may be started and sustained by reversing the polarity of the bias control signal. A plurality of such oscillator circuits, each operable at a different frequency, may be formed on a common circuit board as shown with the lengths of strip conductors 23, 25, 27 formed in serpentine patterns to reduce the physical size requirement of the circuit board. The open end 21 of each of the transmission line resonators 13, 15, 17 is disposed adjacent a strip line conductor 43 isolated from one of the ground plane conductors 29. The width of this conductor 43 and its spacing from the opposite ground plane 31 are selected to provide a 50-ohm transmission line for convenient matched coupling to a utilization circuit connected to the output 45. In this manner, the oscillating signal appearing with high signal amplitude at the open end of resonators 13, 15, 17, is capacitively coupled to the output transmission line formed by conductor 43. One end of the transmission line may be terminated in its characteristic impedance 44. Thus, since all the oscillators are connected to the common output, any one or selected ones of the oscillators may be switched on to provide the desired frequency or frequencies at the output 45 simply by applying the necessary bias control signals to the inputs of the appropriate transistors 41.

Therefore, in the oscillator circuit of the present invention, all high impedance points are disposed within or closely adjacent the ground planes in an etched circuit board configuration so that the circuit is not affected by changes in the spacing of adjacent components or by changes in environmental conditions or by mechanical vibrations. Also, each of the plurality of oscillator circuits on the common circuit board is coupled to a common output line but may be independently tuned and operated.

We claim:

1. Signal apparatus comprising:

a selected length of transmission line having a first ground conductor and another conductor spaced therefrom by an insulator, said conductors being disposed in electromagnetic coupling relationship, said first ground conductor including a portion which is electrically insulated from said first ground conductor and said other conductor of said transmission line and which is disposed adjacent the other conductor of the transmission line in electromagnetic coupling relationship therewith;

reactance means connecting said portion to said first ground conductor; and at least one signal port coupled to said transmission line near an end thereof.

2. Signal apparatus as in claim 1 comprising:

a gain stage having an input and an output;

a feedback circuit coupled between the input and output of the gain stage for applying a signal to the input with suffcient amplitude and phase to sustain oscillations; and means coupling said signal port to said feedback circuit.

3. An oscillator as in claim 2 wherein:

said first ground conductor is a substantially planar conductor and said other conductor includes a strip conductor supported by an insulator in spaced, substantially plane-parallel relationship to the first ground conductor;

said transmission line is shorted at one end and open at the end thereof remote from the shorted end; and an output transmission line is disposed adjacent the remote end of said transmission line for capacitively coupling signal on said remote end to the output transmission line.

4. An oscillator as in claim 2 wherein:

said gain stage includes a single transistor having emitter, base and collector electrodes;

means connecting the collector electrode to said other conductor of said transmission line at a point therealong intermediate the ends of the transmission line;

means providing signal coupling between the emitter electrode and said first ground conductor;

means shorting the conductors together at one end of said transmission line with the other end thereof forming an open circuit; and means including an inductor connecting the collector electrode and the base electrode for providing a feedback circuit around the transistor which provides oscillation-sustaining phase shift contributed by said inductor, phase-inverting amplification by said transistor and transit time delay of signal through said transistor.

5. An oscillator as in claim 3 comprising:

a second substantially planar conductor spaced away from said first ground conductor in substantially plane-parallel relationship therewith;

a plurality of strip conductors supported by insulation means intermediate said first and second ground conductors in electromagnetic coupling relationship therewith to form a plurality of transmission lines;

means connecting the corresponding end of each of said strip conductors to a ground conductor such that each of said transmission lines is shorted at one end and open at the end remote from the shorted end; and for each of said transmission lines a gain stage having an output coupled to one of said transmission lines and having an input and a feedback circuit coupled between said input and said output of the corresponding gain stage;

said output transmission line includes a strip conductor which is insulated from said first and second ground conductors and which has selected width and spacing with respect thereto for providing a predetermined characteristic impedance; and the strip conductor forming said output transmission line is disposed adjacent the open ends of said transmission lines for capacitively coupling the signals on the open ends of said transmission lines to said output tranmission line.

References Cited

UNITED STATES PATENTS

| | | | |
|---|---|---|---|
| 3,164,790 | 1/1965 | Oh | 333—10 |
| 3,209,284 | 9/1965 | Hast | 333—10 |

ROY LAKE, *Primary Examiner.*

SIEGFRIED H. GRIMM, *Assistant Examiner.*

U.S. Cl. X.R.

331—56, 117; 338—84